(12) United States Patent
Hawke

(10) Patent No.: US 11,683,646 B2
(45) Date of Patent: Jun. 20, 2023

(54) DEVICE, COMPUTER PROGRAM AND METHOD

(71) Applicants: SONY CORPORATION, Tokyo (JP); SONY EUROPE B.V., Weybridge (GB)

(72) Inventor: Edward Hawke, Basingstoke (GB)

(73) Assignees: SONY CORPORATION, Tokyo (JP); SONY EUROPE B.V., Weybridge (GB)

( * ) Notice: Subject to any disclaimer, the term of this patent is extended or adjusted under 35 U.S.C. 154(b) by 0 days.

(21) Appl. No.: 17/204,608

(22) Filed: Mar. 17, 2021

(65) Prior Publication Data

US 2021/0297779 A1    Sep. 23, 2021

(30) Foreign Application Priority Data

Mar. 17, 2020    (GB) ..................... 2003861

(51) Int. Cl.
*H04R 3/00* (2006.01)
*H04R 3/12* (2006.01)
*G06F 3/16* (2006.01)
*H04R 1/40* (2006.01)
*H04R 27/00* (2006.01)

(52) U.S. Cl.
CPC .............. *H04R 3/12* (2013.01); *G06F 3/165* (2013.01); *H04R 1/403* (2013.01); *H04R 27/00* (2013.01); *H04R 2430/01* (2013.01)

(58) Field of Classification Search
CPC .......... H04R 3/12; H04R 1/403; H04R 27/00; H04R 2430/01
USPC .... 381/56, 77–80, 98, 103, 63, 104–109, 61
See application file for complete search history.

(56) References Cited

U.S. PATENT DOCUMENTS

| 5,668,859 | A | 9/1997 | Salimando |
| 7,038,575 | B1 | 5/2006 | Frohman et al. |
| 9,979,499 | B2 * | 5/2018 | Oldfield ............... G10H 1/0008 |
| 10,496,358 | B1 * | 12/2019 | Hirst .................. H04N 21/8106 |
| 2008/0130908 | A1 * | 6/2008 | Cohen ...................... H04S 1/00 381/71.1 |
| 2011/0111739 | A1 | 5/2011 | Borodulin |
| 2012/0269360 | A1 * | 10/2012 | Burke ....................... A47C 1/12 381/77 |
| 2015/0131845 | A1 * | 5/2015 | Forouhar ............ G06F 16/7837 382/100 |
| 2021/0321209 | A1 * | 10/2021 | So ........................... H04R 5/02 |

FOREIGN PATENT DOCUMENTS

| EP | 1 659 519 A2 | 5/2006 | |
| WO | WO 2009/094728 A1 | 8/2009 | |
| WO | WO-2018199115 A1 * | 11/2018 | ............... A63J 5/00 |

* cited by examiner

*Primary Examiner* — Disler Paul
(74) *Attorney, Agent, or Firm* — Oblon, McClelland, Maier & Neustadt, L.L.P.

(57) ABSTRACT

A method of distributing sound in a sporting venue, comprising: determining an event based on a position of at least one player and/or sporting projectile within the sporting venue; selecting a sound effect based on the determined event; and sending the sound effect to at least one speaker located in the sporting venue.

18 Claims, 11 Drawing Sheets

| Position of player(s) | Position of Ball | Event | Sound Effect |
|---|---|---|---|
| Away – one running down wing<br>Home – running into penalty box | With runner | Possible cross | Away Cross |
| Away – only goalkeeper behind ball<br>Home – one running to goal | With runner | Possible break | Home break |
| Away – player stood in corner. Other players in penalty box<br>Home – players stood around penalty box | In corner with player | Corner kick | Away Corner Kick |
| Away – players stood in a wall<br>Home – Player stood by ball | With Home player | Free kick close to goal | Home free kick close to goal |
| Away – one player in penalty box.<br>Home – all outfield players outside penalty box | On penalty spot | Penalty kick | Away penalty kick |

FIG. 3

| Sound Effect | Mix of Sounds | Volume of Sounds per speaker (A=away, H=Home) |
|---|---|---|
| Away Cross | General Background<br>Excitement<br>Nervous | A=50%, H=40%<br>A=50%, H=0%<br>A=0%, H=30% |
| Home break | General Background<br>Excitement<br>Nervous | A=30%, H=50%<br>A=0%, H=50%<br>A=40%, H=0% |
| Away Corner Kick | General Background<br>Excitement<br>Nervous | A=60%, H=30%<br>A=50%, H=0%<br>A=0%, H=50% |
| Home Free kick close to goal | General Background<br>Excitement<br>Nervous | A=20%, H=60%<br>A=0%, H=40%<br>A=50%, H=0% |
| Away penalty kick | General Background<br>Excitement<br>Nervous | A=30%, H=30%<br>A=70%, H=0%<br>A=0%, H=70% |

FIG. 4

DEVICE, COMPUTER PROGRAM AND METHOD

CROSS-REFERENCE TO RELATED APPLICATIONS

This application claims priority under 35 U.S.C. § 119 or 365 to Great Britain Application No. 2003861.8, filed Mar. 17, 2020. The entire contents of the above application(s) are incorporated herein by reference.

BACKGROUND

Field of the Disclosure

The present technique relates to a device, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

In some situations, sporting events such as soccer matches, rugby matches, tennis matches or the like are played with no audience or spectators present. This is sometimes referred to as "playing behind closed doors". This situation may occur as a result of a contagious disease being present in the general population (such as the Covid-19 global pandemic in 2020) or because as a punishment by a sporting regulator.

There are a number of problems with playing behind closed doors which the present disclosure aims to address. Firstly, the player or players taking part in the sporting event use the presence of spectators to motivate themselves. This is particularly the case with the sounds made by the spectators such as cheering, booing, clapping and the like as well as the general noise made by such a large number of people as would normally be present in a sporting venue. Secondly, broadcasters who televise the sporting event notice that the noise generated by spectators masks some of the noises and comments made by players and their coaches on the pitch. Thirdly, a match played with spectators is more engaging for the audience at home as the audio allows the spectators to feel the emotion associated with the match.

It is an aim of the disclosure to address these at least one of these issues.

SUMMARY

According to embodiments of the disclosure, there is provided a method of distributing sound in a sporting venue, comprising: determining an event based on a position of at least one player and/or sporting projectile within the sporting venue; selecting a sound effect based on the determined event; and sending the sound effect to at least one speaker located in the sporting venue.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 shows a data structure according to embodiments explaining the determination of the sound effect;

FIG. 4 shows a data structure according to embodiments of the disclosure explaining the sound effect in more detail;

DESCRIPTION OF THE EMBODIMENTS

Figure 1:
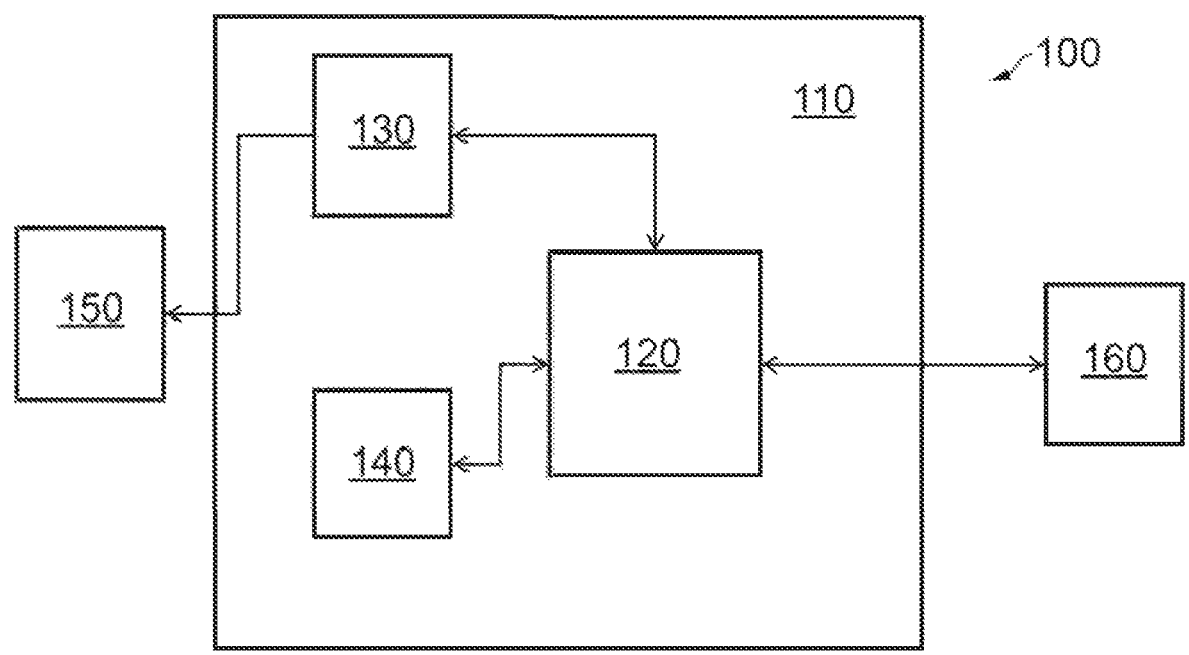
FIG. 1 shows a device 100 according to embodiments of the present disclosure.

Referring now to the drawings, wherein like reference numerals designate identical or corresponding parts throughout the several views.

FIG. 1 shows a device 110 according to embodiments of the present disclosure. The device 110 is part of a broader system 100 that additionally includes at least one speaker 150. In particular, the device 110 according to embodiments of the disclosure may be connected to, and control the sound output by, the speaker 150. As will become apparent, the speaker 150 may form part of a public address system in a sporting venue such as a stadium or the like. Of course, in embodiments, the disclosure is not so limited and one or more of the speakers 150 connected to the device 100 may be portable speakers brought to the sporting venue by a third party when required.

The device 110 may be embodied as a standalone device apparatus or may be a computer running a computer program or indeed may be embodied as circuitry on a semiconductor chip. The device 110 comprises processing circuitry 120 connected to storage 140 and audio circuitry 130. The processing circuitry 120 may also receive event information from an external source 160. This will be explained later. The audio circuitry 130 is solid state circuitry that controls the sound output to the at least one speaker 150. The audio circuitry 130 is controlled by the processing circuitry 120.

The processing circuitry 120 is solid state circuitry that is controlled by a computer program to perform a method according to embodiments of the disclosure. The processing circuitry 120 may therefore be a microprocessor, Application Specific Integrated Circuitry or the like. The computer program comprises computer readable code that is capable of controlling the processing circuitry 120. The computer program is stored on storage 140. Storage 140 may be solid state storage, optically or magnetically readable storage or the like. Moreover, although the Figure shows the storage 140 as being included in the device 110, the disclosure is not so limited. In embodiments, the storage 140 may be located separately to the device 110 on a network such as Local Area Network or over the internet or the like.

As noted above, the processing circuitry 120 is connected to an external source 160 that provides event information. This event information may include an output from goal line technology developed by Hawk-Eye Innovations® that indicates a goal has been scored in a soccer match. In addition, the event information may include an output from Hawk-Eye used in tennis matches developed by Hawk-Eye Innovations®. These include the Electronic Line Calling System. The event information may be provided by a number of systems which indicate various events during a soccer match such as offside calls, fouls, red and yellow cards and the like. For example, Opta® provides this information. The Opta® system use loggers watching either at the stadium live, or the TV coverage, to manually tag events they see happening. Of course, other systems exist such as an Electronic Player Tracking System (EPTS) technology, which will provide the positions of all the players and the ball (including the players' limb positions). There is also an Auto-Offside system which can make automated judgements in some offside cases.

In embodiments, where the full skeletal details are provided (such as in the EPTS system), it is possible to use AI to try to judge some non-gameplay based actions. For example, if there are a plurality of home-team players crowding around the referee waving their arms, the home-team players are likely to be annoyed at the decision the referee has just given. This information may be used to assist in the determination of the sound effect.

Figure 2A:
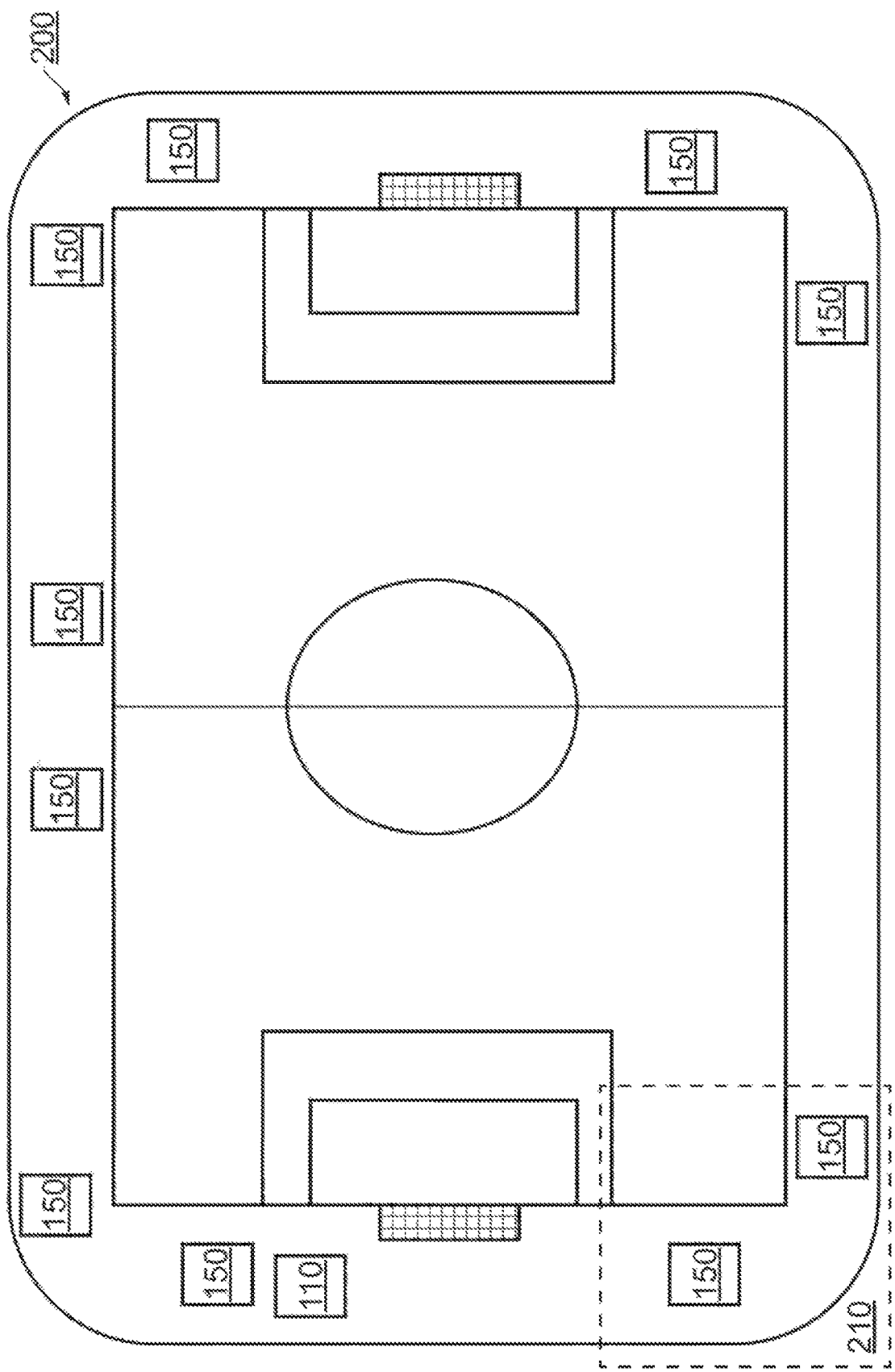
FIGS. 2A to 2F show a sporting venue 200 with players in various positions explaining embodiments of the disclosure.

Referring to FIG. 2A, a sporting venue 200 is shown. In embodiments, the sporting venue 200 is a soccer stadium. Of course, the disclosure is not so limited. The sporting venue 200 may be any venue where a sporting event is carried out. For example, the sporting venue 200 may be a rugby stadium, an American Football Stadium, a basketball stadium, a tennis stadium, hockey stadium, ice hockey stadium, volleyball stadium or the like.

Located within the sporting venue 200 is a plurality of speakers 150. In the example of FIG. 2A, there are 10 speakers located at different positions around the sporting venue 200. However, the disclosure is not so limited and any number of speakers is envisaged. In embodiments, the speakers are positioned into one or more zones. These zones, in embodiments, align with the position of various spectators who would be normally present in the sporting venue 200 when the sporting event is played with spectators in attendance. For example, the two speakers surrounded by box 210 are positioned where the spectators supporting the visiting team (the away team) would normally be located. The remaining eight speakers are located around the sporting venue in areas where the spectators supporting the home team would normally be located. In other words, the area surrounded by box 210 is the away zone and the remainder of the sporting venue 200 is the home zone.

Although not shown for clarity, the sporting venue 200 will, in embodiments, also have a ball tracking and player tracking system installed. This ball tracking and/or player tracking system will be connected to the device 110 and will provide the position of the ball and/or player or players within the sporting venue 200. The device 110 will then, in embodiments, use the position of the ball and/or player(s) within the sporting venue to determine an event. In embodiments, the term event means an event occurring during the match or may be a sequence of past positions and not just the current position. It should be noted that although the following describes a soccer match with a ball, the disclosure is not so limited. The sporting event may be a hockey match that uses a ball or may be another sporting event such as ice hockey that uses a puck. Generally, therefore, although the following describes a ball, the disclosure envisages any sporting projectile.

Referring to FIGS. 2B to 2F, various player and ball/sporting projectile positions are shown. The position of the player or players and/or the position of the sporting projectile (the ball in embodiments) will be used by the device 110 to determine the event occurring on the pitch. Of course, in embodiments, the event occurring on the pitch may be provided by the external source 160.

Once the device 110 determines the event occurring on the pitch, a sound effect is chosen. The sound effect is, in embodiments, composed of one or more sound clips. The sound clips are sound recordings of short duration. For example, the sound clips are sound recordings of, say, 10 minutes in length of spectators from soccer matches. Of course, the length of the clip may be more or less than this period. In embodiments, the sound clips are of spectators 1) during normal play (i.e. when no event is taking place); 2) sounding excited and 3) sounding nervous. Of course, the disclosure is not so limited and various other sound clips may be recorded such as spectators: chanting or singing (these chants or songs may be specific to one of the teams playing in the match or may be more general football chants); cheering; booing or the like. Although these sound clips may be recorded samples, the disclosure is not so limited and the sound clips may be synthesised.

The sound effect is generated by appropriately mixing the volume levels of one or more of the sound clips in a manner appropriate for the event. For example, where a home player is about to take a free kick near the goal of the away team, the spectators supporting the home team would sound excited and the spectators supporting the away team would be nervous. It is also probable that the spectators supporting the home team would be louder than those supporting the away team. The volume levels of the sound clips would therefore be mixed to generate a sound effect for the home team that will be played through the speaker or speakers 150 located in the home zone and a sound effect for the away team that would be played through the speaker or speakers 150 located in the away zone. In other words, the sound effect is sent, by the device 110, to at least one speaker located at a position within the sporting venue. This would replicate the sounds created by spectators when an event takes place on the pitch and so would address the problems identified above.

Figure 2B:
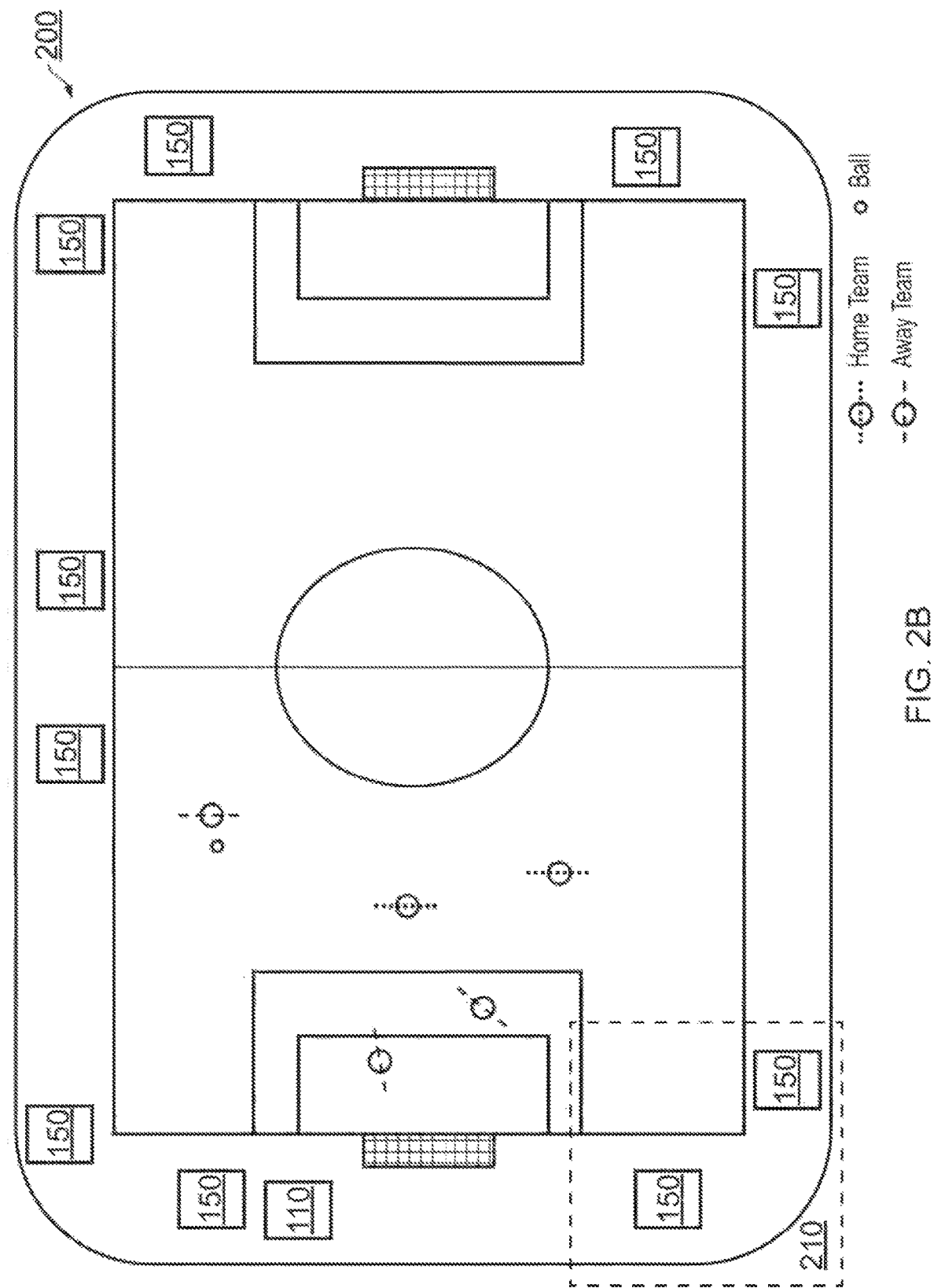

In FIG. 2B, the ball is located at the feet of an away team player running towards the home team goal. As the away team player who is in possession of the ball is running down the wing, and as other away team players are running into the penalty box of the home team, a cross into the home team penalty box is the event. This event is determined based on a position of at least one player and the ball within the sporting venue.

Figure 2C:
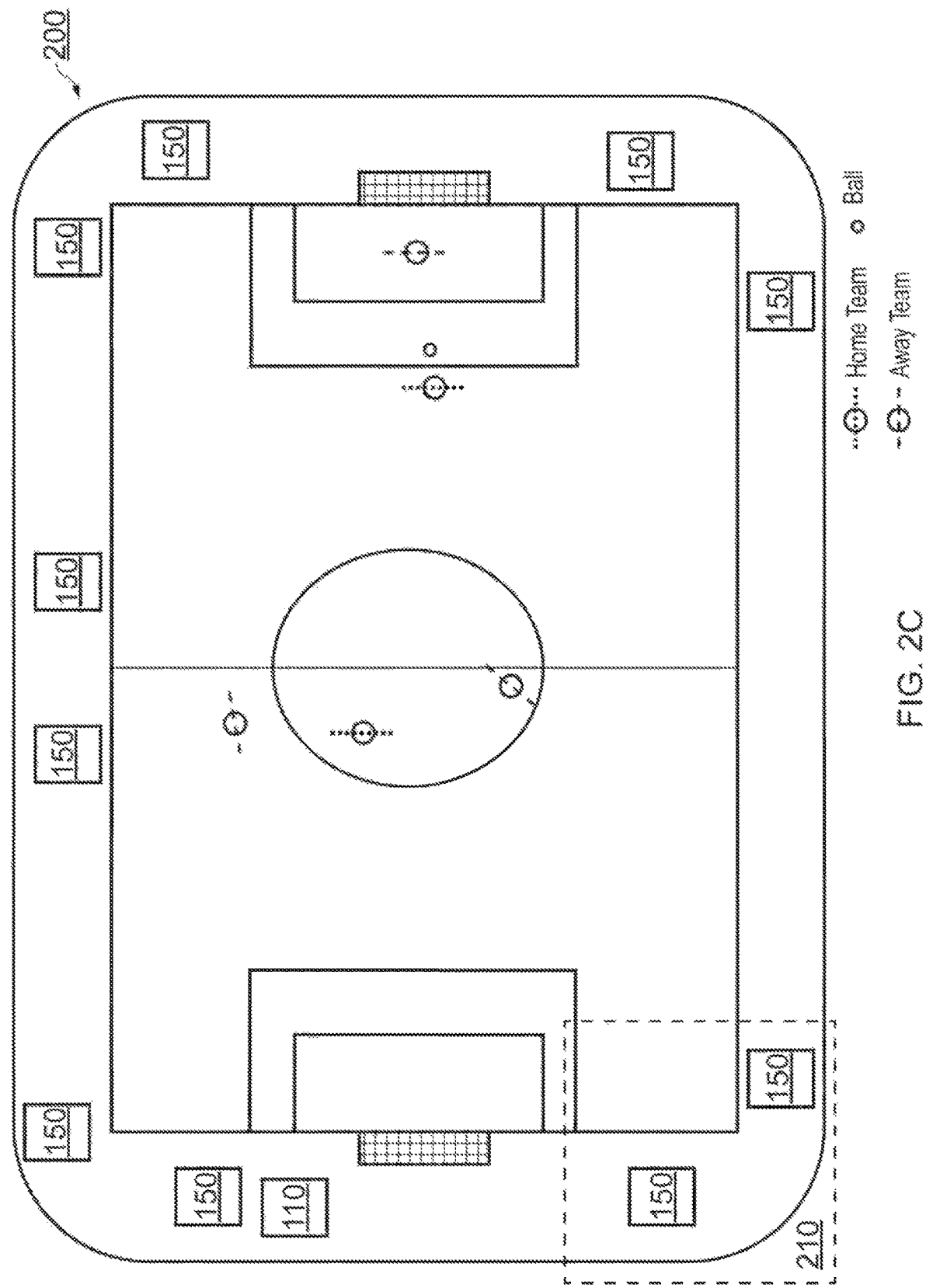

In FIG. 2C, the ball is located at the feet of a home team player running towards the away team goal. As the home team player who is in possession of the ball is running towards the goal, and as the away team goalkeeper is the only player between the ball and the away goal, then a possible break for the home team is the event.

Figure 2D:
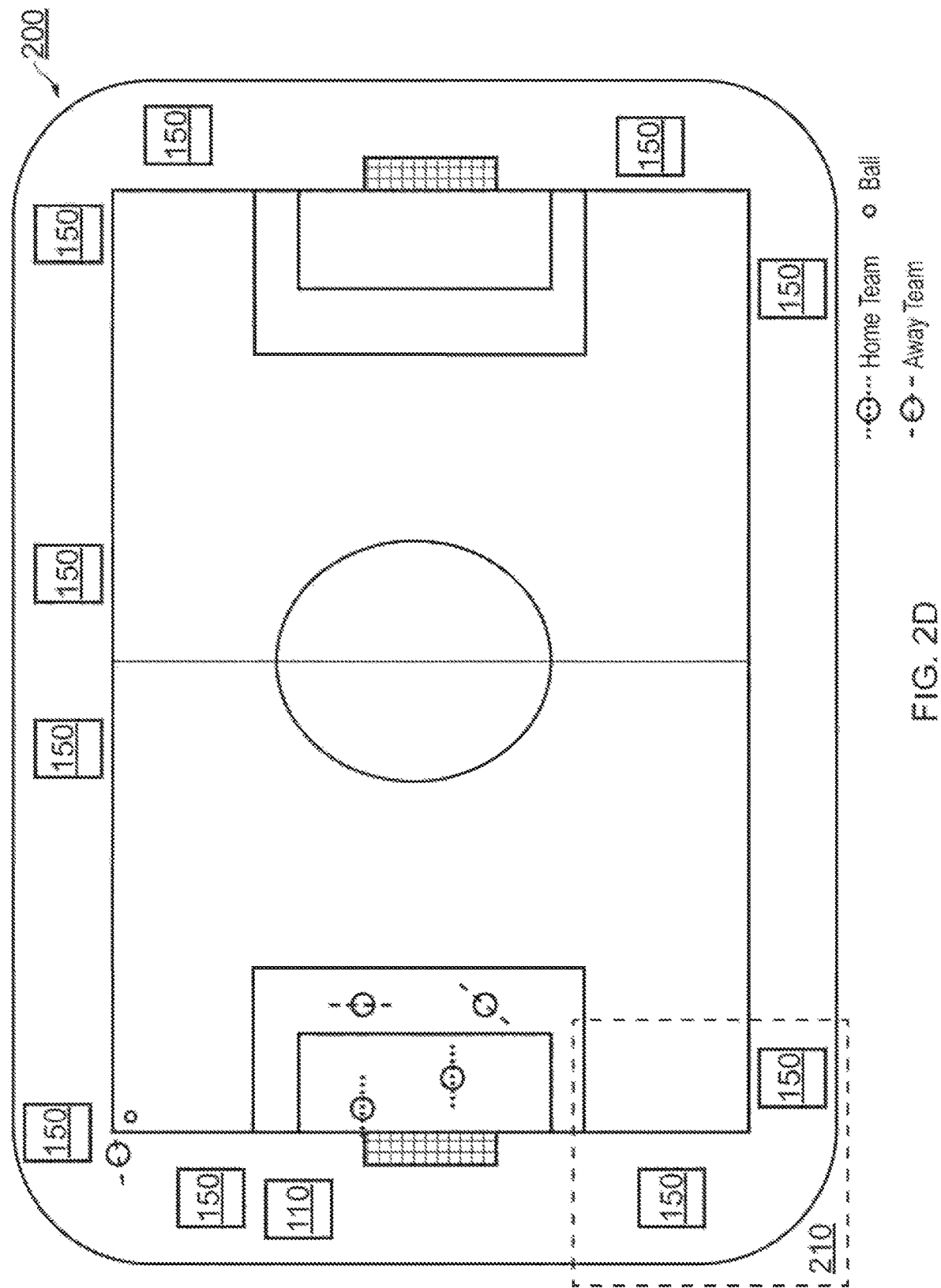

In FIG. 2D, the ball is stationary and located in the corner near the goal of the home team. The position of the ball indicates that a corner kick for the away team is the event. In addition, the position of the away team players further supports this. In particular, an away team player is in possession of the stationary ball and other away team players are positioned within the home team penalty box.

Figure 2E:
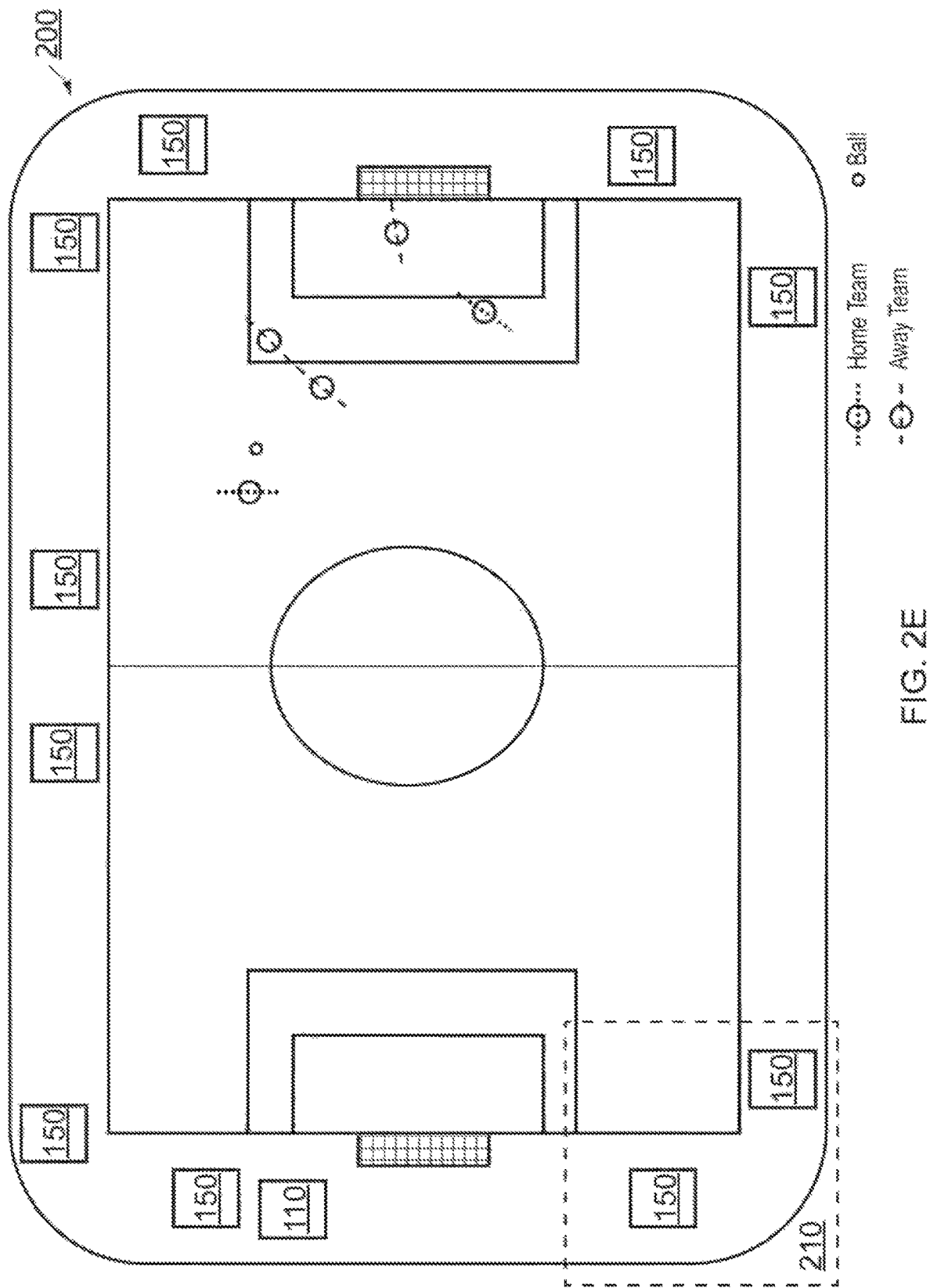

In FIG. 2E, the ball is stationary and located near the penalty box of the away team. A layer for the home team is stood near the ball and a wall of away team players has been formed. This means that the position of the ball and one or more of the players indicates that the event is a free kick close to the away team goal.

Figure 2F:
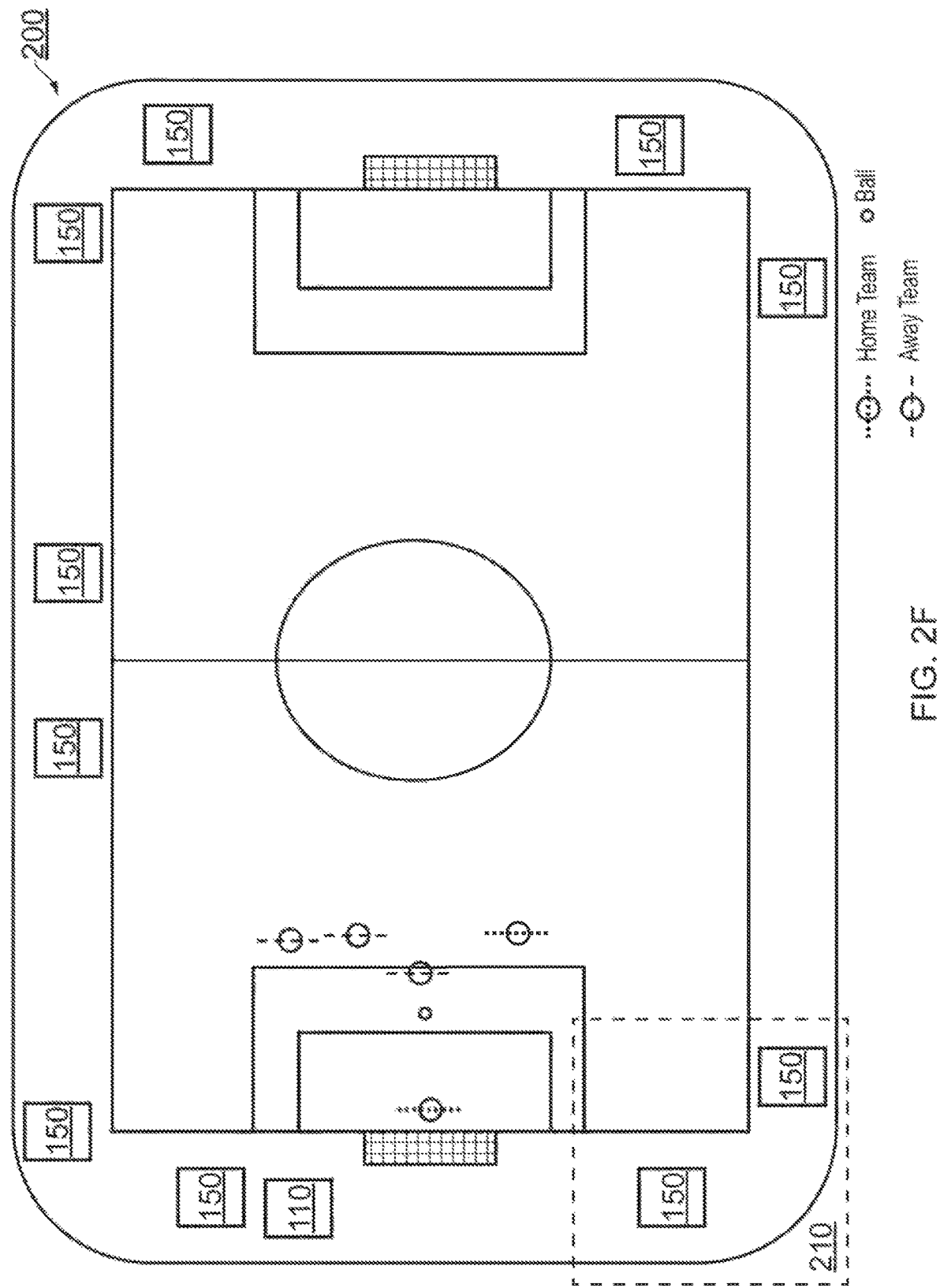

In FIG. 2F, the ball is stationary on the penalty spot in the home team's penalty area. As the ball is stationary and positioned on the penalty spot, the position of the ball indicates that there is a penalty kick. Moreover, the position of at least one of the players indicate that a penalty kick is about to be taken. Specifically, the away team player is stood in the penalty area and the only other player in the penalty box is the goalkeeper of the home team. This indicates that a penalty kick is about to be taken. Therefore, the position of at least one player and/or the ball may be used to determine the event.

FIG. 3 shows a data structure according to embodiments explaining the determination of the sound effect using the positon of at least one player and/or ball. Specifically, the example situations of FIGS. 2R to 2F are shown in FIG. 3.

Specifically, the position of one or more player, the position of the ball, the event and the associated sound effect is shown in FIG. 3. It should be appreciated that although FIG. 3 shows positions of the ball and one or more player, only the position of ball and/or at least one of the players is necessary to determine the event as explained above with reference to FIGS. 2B to 2F. For brevity, the data structure of FIG. 3 will not be explained in detail as the position information was described with reference to FIGS. 2B to 2F for each scenario.

Although the foregoing describes many scenarios in which the position of at least one player and/or ball will allow the determination of the event, the disclosure is not so limited. For example, the event may be provided from the external source 160. In particular, the external source 160 may be goal line technology that indicates to the match referee that the ball has crossed the line of either the home or away team goal and so the goal is awarded. In embodiments, the goal line technology may indicate to the device 110 that a goal has been scored. Moreover, the goal line technology indicates which goal line (either the home or away team) has been crossed. This indicates whether the home team or away team has scored. In other embodiments, the external source 160 may identify free kicks, corners, the issuance of red or yellow cards or the like. In this case, it is not necessary to use the position of at least one player and/or the ball to determine the event. However, once the event is identified, an appropriate sound effect may be generated.

In some instance, the external source 160 may provide an event which results in slightly delayed reactions. In this instance, the broadcaster may delay their pictures such that the audio is more naturally synced with the audio feed for the broadcaster. In other embodiments a system may be provided that ingests the output from the broadcaster, ingests the event from the external source 160, synthesises the audio, delays the video and applies the synthesised audio to it before outputting it again.

In embodiments, the external source 160 may be audio from the sporting venue 200. In particular, microphones (not shown) may be provided around the sporting venue 200 to capture audio within the sporting venue 200. This may be used to identify various events. For example, the captured audio may include a whistle. This will indicate that the referee is either stopping the game (in which case an event may have taken place) or that a ball is about to be kicked. For example, the referee blows the whistle to restart the game after an incident.

In some embodiments, the external source 160 may be the match clock or the scoreboard. In this instance, if one team is in the lead and the match is about to finish, the event may be a jubilant winning team or a nervous losing team with an appropriate selection of sound effect. In other instances, if the ball is kept by the winning team for a predetermined length of time or for a predetermined number of passes (so-called "time wasting"), the spectators for the winning team may cheer every subsequent pass that is made.

As noted above, after the event is determined, the appropriate sound effect is selected from the data structure of FIG. 3. The sound effect is then sent to one or more speaker based upon the event. This will be explained with reference to FIG. 4.

As noted in FIG. 4, a data structure is provided that associates the sound effect required with one or more sound clips (in the column "Mix of Sounds"). In the Figure, for brevity, the same three sound clips (General Background; Excitement; Nervous) are shown. However, more or less sound clips are envisaged. Moreover, different sound clips may be used for each sound effect as would be appreciated.

The General Background sound clip will be a sound clip of spectators in a sporting venue 200 when no event is taking place. This sound clip provides atmosphere to the sporting venue 200. The Excitement sound clip is a sound clip of spectators in a sporting venue 200 when an event is taking place or has taken place that could lead to a goal or advantages one team in some way (such as an opposing team player being sent off). The Nervous sound clip is a sound clip of spectators in a sporting venue 200 when an event is taking place or has taken place that disadvantages one team in some way, for example, an opposing team approaching a goal or the like.

Returning to FIG. 4, the volume of each of those sounds is provided to the one or more speakers located in the home zone (identified by H in FIG. 4) or the away zone (identified by A in FIG. 4). In FIG. 4, the volume of each speaker is shown as a percentage of the maximum volume level provided by those speakers.

As will be apparent, the sound effect "Away Cross" determined from FIG. 3 is composed of different proportions of each of the three sound clips. As the spectators supporting the away team will be become increasingly excited, and the spectators supporting the home team are increasingly nervous, the proportions of each sound clip are set accordingly. Specifically, there will be general noise from large numbers of spectators. As the event is increasingly good for the away team, the amount of general noise made by the spectators supporting the away team will generally be higher than that for the spectators supporting the home team. Therefore, the proportion of the General Background sound clip is 50% of maximum volume for the away zone speakers and 40% of the maximum volume for the home zone speakers. In addition, the sound of excitement is set to 50% of the maximum volume level for the away zone speakers and 0% of the maximum volume for the home zone speakers (as the spectators supporting the home team will not be excited by the away team crossing the ball into their penalty box). Finally, the sound of nervous is set to 0% of the maximum volume level for the away zone speakers and 30% of the maximum volume for the home zone speakers. As will be appreciated, the total volume level for the speakers in the away zone will be 100% of their maximum and in the home zone will be 70% of their maximum. This is because the spectators in the away zone would normally make more noise than those in the home zone when a cross is played into the penalty box of the home team. Therefore, not only is the sound effect selected (or in this case mixed from three constituent sound clips), optionally, the volume of the at least one speaker in each zone is controlled based upon the determined event.

FIG. 4 notes the proportion of each sound clip to the or each speaker in the respective zones for each sound effect noted in FIG. 3. For brevity, this will not be described in detail.

Although the foregoing describes the position as the current position of the ball or one or more player, the disclosure is not so limited. For example, the past position of the ball and/or player may be used. Specifically, the current position of a player may indicate that he or she is running into an opponent's penalty box. However, the referee may have blown their whistle to indicate that said player was previously offside. Therefore, the appropriate sound effect would be for an offside event.

It should be noted that when the event is provided by the external source 160, the selection of the sound effect is similar. In particular, the event column of FIG. 3 identifies the event and the corresponding sound effect is determined from the column entitled "sound effect". The sound clips used and their respective volumes is then chosen from the data structure of FIG. 4.

Figure 5:
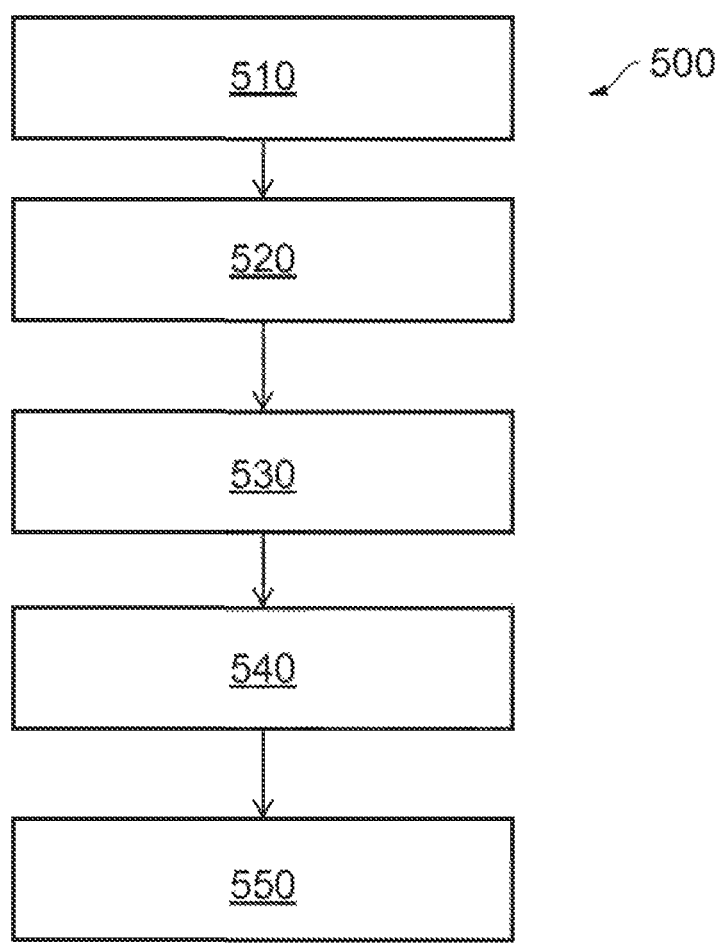
FIGS. 5 and 6 show processes according to embodiments of the disclosure.
Figure 6:
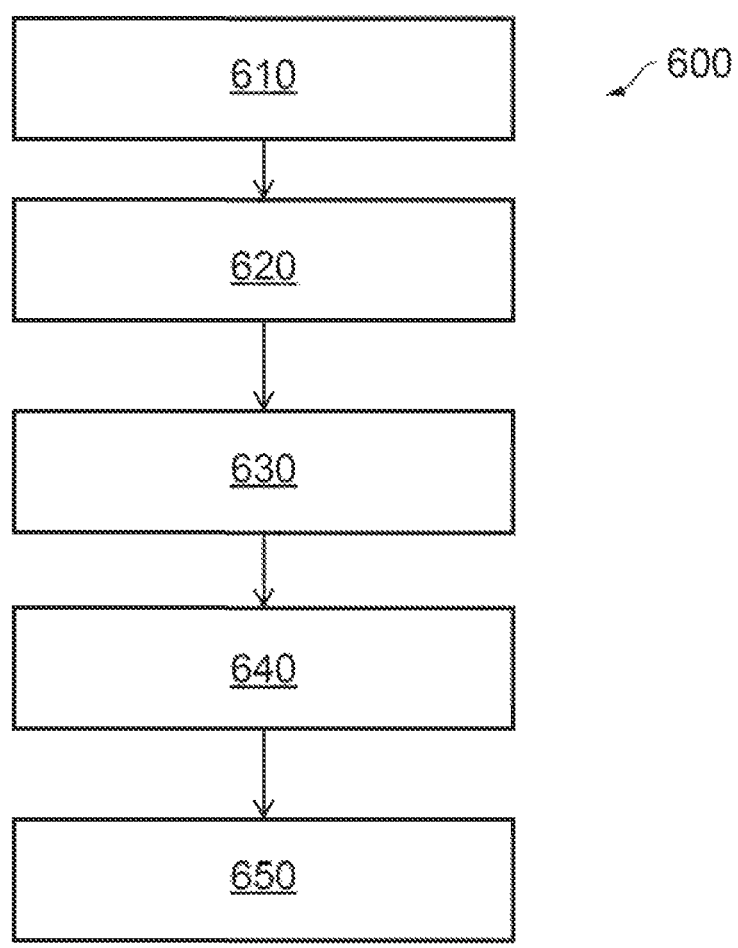

FIGS. 5 and 6 show processes according to embodiments of the disclosure.

Referring to FIG. 5, a process 500 according to embodiments is described. These processes are performed by circuitry in the device 110. The circuitry may be the processing circuitry 120 alone or the processing circuitry 120 in combination with the audio circuitry 130. The process 500 starts at step 510. The process moves to step 520 where the processing circuitry 120 determines an event based on a position of at least one player and/or sporting projectile within the sporting venue. The process then moves to step 530, where the processing circuitry 120 selects a sound effect based on the determined event. The process then moves to step 540 where the processing circuitry 120 sends the sound effect to at least one speaker located in the sporting venue. This may be using the audio circuitry 130. The process ends in step 550.

Referring to FIG. 6, a process 600 according to embodiments is described. These processes are performed by circuitry in the device 110. The circuitry may be the processing circuitry 120 alone or the processing circuitry 120 in combination with the audio circuitry 130. The process 600 starts at step 610. The process moves to step 620 where the processing circuitry 120 receives an indication of an event within a match being played within the sporting venue. The process then moves to step 630, where the processing circuitry 120 selects a sound effect based on the received event. The process then moves to step 640 where the processing circuitry 120 sends the sound effect to at least one speaker located in the sporting venue. This may be using the audio circuitry 130. The process ends in step 650.

Although the foregoing describes using a plurality of sound clips to generate the sound effect, the disclosure is not so limited and a single sound clip may be used. For example, a sound clip from a soccer match where spectators were present when a similar event occurred may be used. Moreover, it is possible to use machine learning to improve the selection of sound clips and the associated volume levels. In this case, during a training phase, the device 110 may select the sound clips and apply the appropriate mixing levels to the sound clips for a given event. Microphones may then be used to capture the sounds made by spectators in a match where spectators are present for the same event. The selection made by the device 110 may be compared with that sound captured of the spectators and the mixing levels and selection of the sound clips may be altered.

Although the foregoing describes a single event determining the sound effect, the disclosure is not so limited. For example, a sequence of events may define the sound effect that is used. This may be a compound event. For example, a dribble, followed by a foul followed by a red card in a short space, may direct the sound mixing.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1) A method of distributing sound in a sporting venue, comprising:
   determining an event based on a position of at least one player and/or sporting projectile within the sporting venue;
   selecting a sound effect based on the determined event; and
   sending the sound effect to at least one speaker located in the sporting venue.

2. A method according to clause 1, wherein the sporting projectile is either a ball or a puck.

3. A method of distributing sound in a sporting venue, comprising:
   receiving an indication of an event within a match being played within the sporting venue;
   selecting a sound effect based on the received event; and
   sending the sound effect to at least one speaker located in the sporting venue.

4) A method according to any preceding clause, wherein the sound effect is comprised of one or more sound clips mixed together based upon the event.

5. A method according to any preceding clause, further comprising:
controlling the volume of the or each speaker based upon the event.

6. A method according to any preceding clause, further comprising:
sending the sound clip to at least one speaker located at a predetermined location within the sporting venue.

7) A method according to clause 3, wherein the indication is that the event that either a video review is being used or that a scoring event has occurred.

8) A device for distributing sound in a sporting venue, comprising circuitry configured to:
determine an event based on a position of at least one player and/or sporting projectile within the sporting venue;
select a sound effect based on the event; and
send the sound effect to at least one speaker located in the sporting venue.

9. A device according to clause 8, wherein the sporting projectile is either a ball or a puck.

10. A device for distributing sound in a sporting venue, comprising circuitry configured to: receive an indication of an event within a match being played within the sporting venue; select a sound effect based on the received event; and send the sound effect to at least one speaker located in the sporting venue.

11. A device according to any one of clause 8 to 10, wherein the sound effect is comprised of one or more sound clips mixed together based upon the event.

12. A device according to any one of clause 8 to 11, wherein the circuitry is further configured to:
control the volume of the or each speaker based upon the event.

13) A device according to any one of clauses 8 to 12, wherein the circuitry is further configured to:
send the sound clip to at least one speaker located at a predetermined location within the sporting venue.

14) A device according to clause 10, wherein the indication is that the event that either a video review is being used or that a scoring event has occurred 15) A computer program comprising computer readable instructions which, when loaded onto a computer, configures the computer to perform a method according to any one of clauses 1 to 7.

Obviously, numerous modifications and variations are possible in light of the above teachings.

The invention claimed is:

1. A method of distributing sound in a sporting venue, comprising:
determining an event based on a position of at least one player and/or sporting projectile within the sporting venue;
selecting a sound effect based on the determined event; and
sending the sound effect to only at least one speaker located at a predetermined location within the sporting venue,
wherein the predetermined location depends on a team of the at least one player and on the position of the sporting projectile within the sporting venue with respect to a goal position of the team.

2. The method according to claim 1, wherein the sporting projectile is either a ball or a puck.

3. The method according to claim 1, wherein the sound effect is comprised of one or more sound clips mixed together based upon the event.

4. The method according to claim 1, further comprising:
controlling the volume of the or each speaker based upon the event.

5. A non-transitory computer readable medium having stored thereon a computer program comprising computer readable instructions which, when loaded onto a computer, configures the computer to perform the method according to claim 1.

6. The method according to claim 1, wherein the predetermined location depends on the team of the at least one player and/or on the position of the sporting projectile within the sporting venue with respect to a goal position of the team such that the sound effect is sent to at least one speaker located at the predetermined location within the sporting venue that corresponds to the team of the at least one player.

7. The method according to claim 1, wherein the predetermined location depends on the team of the at least one player and/or on the position of the sporting projectile within the sporting venue with respect to a goal position of the team.

8. The method according to claim 1, wherein the predetermined location depends on the team of the at least one player.

9. The method according to claim 1, wherein the predetermined location depends on the position of the sporting projectile within the sporting venue with respect to a goal position of the team.

10. A method of distributing sound in a sporting venue, comprising: receiving an indication of an event within a match being played within the sporting venue; selecting a sound effect based on the received event; and sending the sound effect to only at least one speaker located at a predetermined location within the sporting venue, wherein the predetermined location depends on a team of the at least one player and on the position of the sporting projectile within the sporting venue with respect to a goal position of the team.

11. The method according to claim 10, wherein the indication is that the event that either a video review is being used or that a scoring event has occurred.

12. A device for distributing sound in a sporting venue, comprising:
circuitry configured to:
determine an event based on a position of at least one player and/or sporting projectile within the sporting venue;
select a sound effect based on the determined event; and
send the sound effect to only at least one speaker located at a predetermined location within the sporting venue,
wherein the predetermined location depends on a team of the at least one player and on the position of the sporting projectile within the sporting venue with respect to a goal position of the team.

13. The device according to claim 12, wherein the sporting projectile is either a ball or a puck.

14. The device according to claim 12, wherein the sound effect is comprised of one or more sound clips mixed together based upon the event.

15. The device according to claim 12, wherein the circuitry is further configured to:
control the volume of the or each speaker based upon the event.

16. The device according to claim 12, wherein the circuitry is further configured to:

send the sound clip to at least one speaker located at the predetermined location within the sporting venue.

17. A device for distributing sound in a sporting venue, comprising:
circuitry configured to:
receive an indication of an event within a match being played within the sporting venue;
select a sound effect based on the received event; and
send the sound effect to only at least one speaker located at a predetermined location within the sporting venue, wherein the predetermined location depends on a team of the at least one player and on the position of the sporting projectile within the sporting venue with respect to a goal position of the team.

18. The device according to claim 17, wherein the indication is that the event that either a video review is being used or that a scoring event has occurred.

* * * * *